United States Patent
Krolick et al.

(10) Patent No.: US 9,016,191 B2
(45) Date of Patent: Apr. 28, 2015

(54) PORTABLE BAKING OVEN

(71) Applicants: Robert S. Krolick, Roseville, CA (US);
Sanford Shapiro, San Rafael, CA (US);
Cory Thomas Borovicka, Oakland, CA (US)

(72) Inventors: Robert S. Krolick, Roseville, CA (US);
Sanford Shapiro, San Rafael, CA (US);
Cory Thomas Borovicka, Oakland, CA (US)

(73) Assignees: Robert S. Krolick, Roseville, CA (US);
Sanford Shapiro, San Rafael, CA (US)

( * ) Notice: Subject to any disclaimer, the term of this patent is extended or adjusted under 35 U.S.C. 154(b) by 0 days.

(21) Appl. No.: 13/865,630

(22) Filed: Apr. 18, 2013

(65) Prior Publication Data

US 2013/0276643 A1    Oct. 24, 2013

Related U.S. Application Data

(60) Provisional application No. 61/636,191, filed on Apr. 20, 2012.

(51) Int. Cl.
*A47J 37/01* (2006.01)
*A47J 37/06* (2006.01)

(52) U.S. Cl.
CPC .............. *A47J 37/01* (2013.01); *A47J 37/0623* (2013.01); *A47J 37/0658* (2013.01)

(58) Field of Classification Search
USPC .................. 99/447–449, 339, 340, 422, 467;
126/1 R, 19 R, 30, 2, 40, 39 K, 299 R,
126/19.5, 500.54, 552, 553, 345, 26, 4
See application file for complete search history.

(56) References Cited

U.S. PATENT DOCUMENTS 2,072,036 A * 2/1937 Horsman ................... 126/275 R
2,641,243 A * 6/1953 Goss ............................ 126/25 R
4,656,337 A * 4/1987 Lastofka et al. ............... 219/386
4,763,639 A * 8/1988 Goldsworthy ............... 126/25 R
5,097,753 A * 3/1992 Naft ................................ 99/341

(Continued)

FOREIGN PATENT DOCUMENTS

GB         345940 A1 *  3/1931
GB         627760 A1 *  8/1949
WO      2013/037415      10/2013

OTHER PUBLICATIONS

Pizza Making Forum, Pizzamaking.com, 2008 (See pp. 4-5).*

(Continued)

*Primary Examiner* — Dana Ross
*Assistant Examiner* — Renee L Miller
(74) *Attorney, Agent, or Firm* — Steven A. Nielsen; www.NielsenPatents.com

(57) ABSTRACT

A portable baking oven for a pizza or other food item includes a food item heating plate, a base having a heating chamber, and a top cover having a moisture vent and a heat reflector structure extending across the inside of said top cover. When placed on said base, the top cover forms a baking chamber above the heating plate. Heat produced in the base's heating chamber circulates up through air passageways in the base into the baking chamber above the food item heating plate. This circulated heat is reflected back down toward the food item heating plate by the top cover's heat reflecting structure to accelerate baking of the top of a food item placed on the heating plate. The top cover's moisture vent can be located above the heat reflector structure in the top cover, and openings can be provided in the heat reflector structure which allow moisture emitted by a food item being baked in the oven to pass through the reflector structure and out through the top cover moisture vent.

22 Claims, 13 Drawing Sheets

(56) References Cited

U.S. PATENT DOCUMENTS

| | | | |
|---|---|---|---|
| 5,365,833 A * | 11/1994 | Chen | 99/447 |
| 5,592,871 A | 1/1997 | Bartlett | |
| 5,797,386 A * | 8/1998 | Orr | 126/25 R |
| 5,850,780 A * | 12/1998 | Mascia et al. | 99/427 |
| 6,041,769 A | 3/2000 | Llodra, Jr. et al. | |
| 6,054,697 A * | 4/2000 | Woodward et al. | 219/729 |
| 6,425,388 B1 | 7/2002 | Korinchock et al. | |
| 6,615,819 B1 * | 9/2003 | Hernandez Burgos et al. | 126/21 A |
| 6,782,801 B1 | 8/2004 | Correa et al. | |
| 7,059,318 B2 | 6/2006 | Cornfield | |
| 7,173,217 B2 * | 2/2007 | De'Longhi | 219/392 |
| 7,219,663 B2 | 5/2007 | Cuomo | |
| 7,686,010 B2 * | 3/2010 | Gustavsen | 126/273.5 |
| 2003/0145741 A1 * | 8/2003 | Holl | 99/450 |
| 2009/0020111 A1 * | 1/2009 | Immordino | 126/9 R |
| 2009/0064985 A1 * | 3/2009 | Gustavsen | 126/21 A |
| 2011/0049125 A1 * | 3/2011 | Home | 219/405 |
| 2011/0214662 A1 * | 9/2011 | Contarino, Jr. | 126/25 R |
| 2012/0164591 A1 * | 6/2012 | Chadwick et al. | 432/1 |

OTHER PUBLICATIONS

Broil King Keg Forum, Grill Pizza Stone Discussion and Pictures, Sep. 1, 2012 (pp. 1-7).*

* cited by examiner

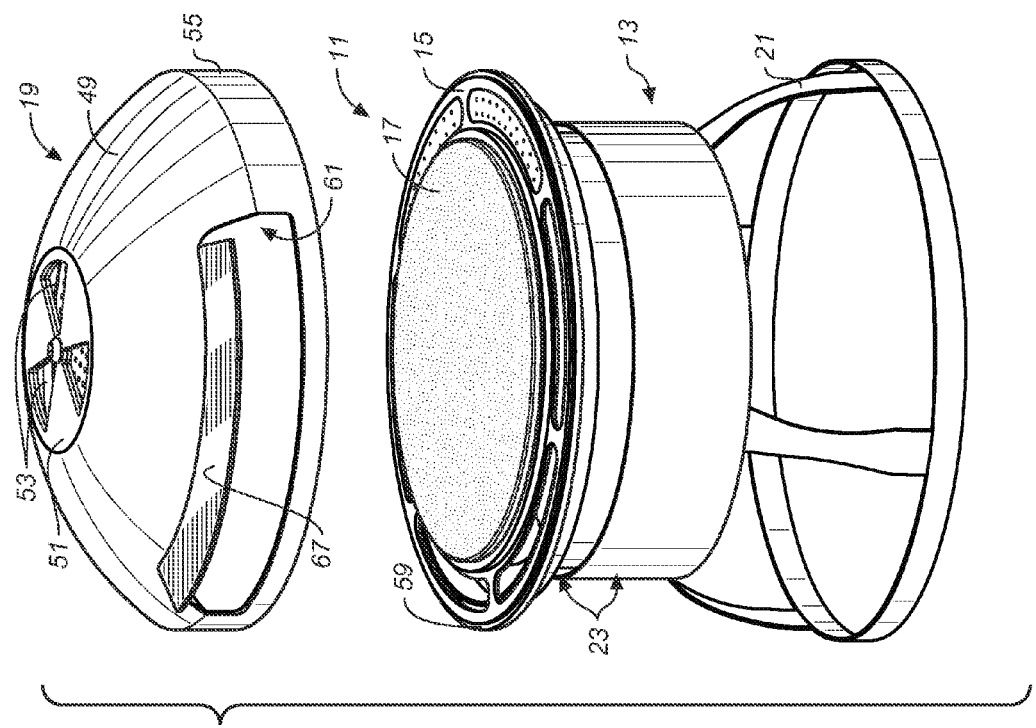
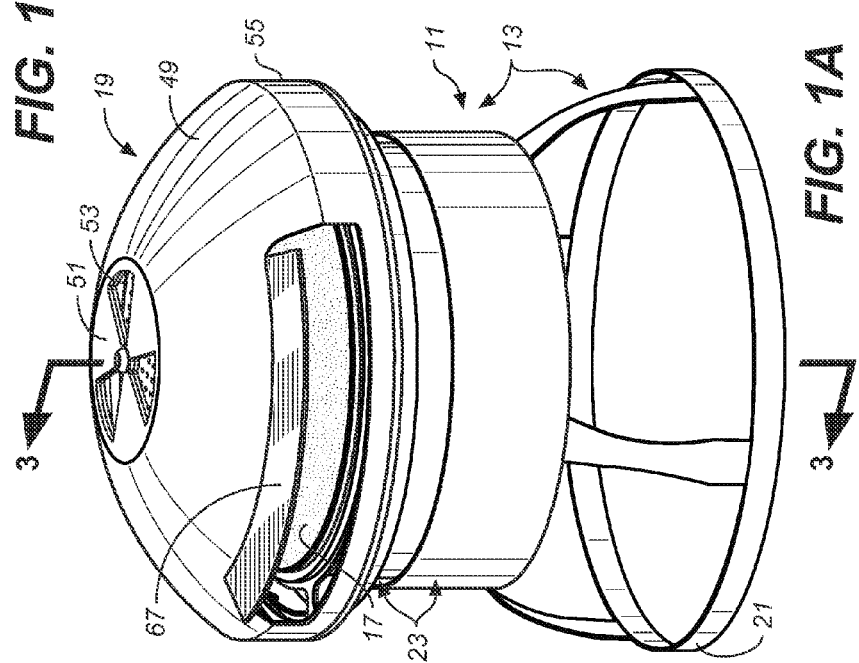

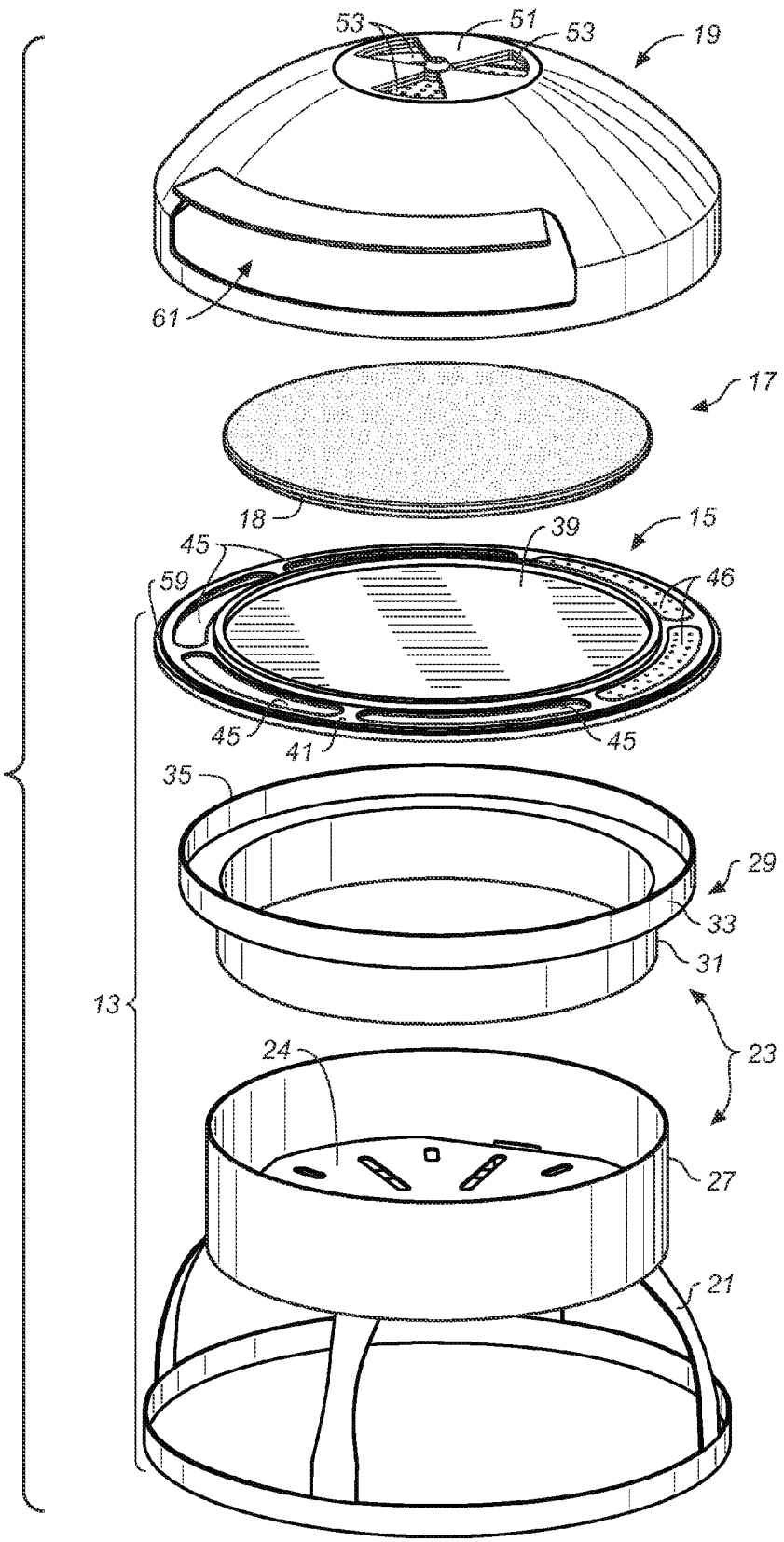

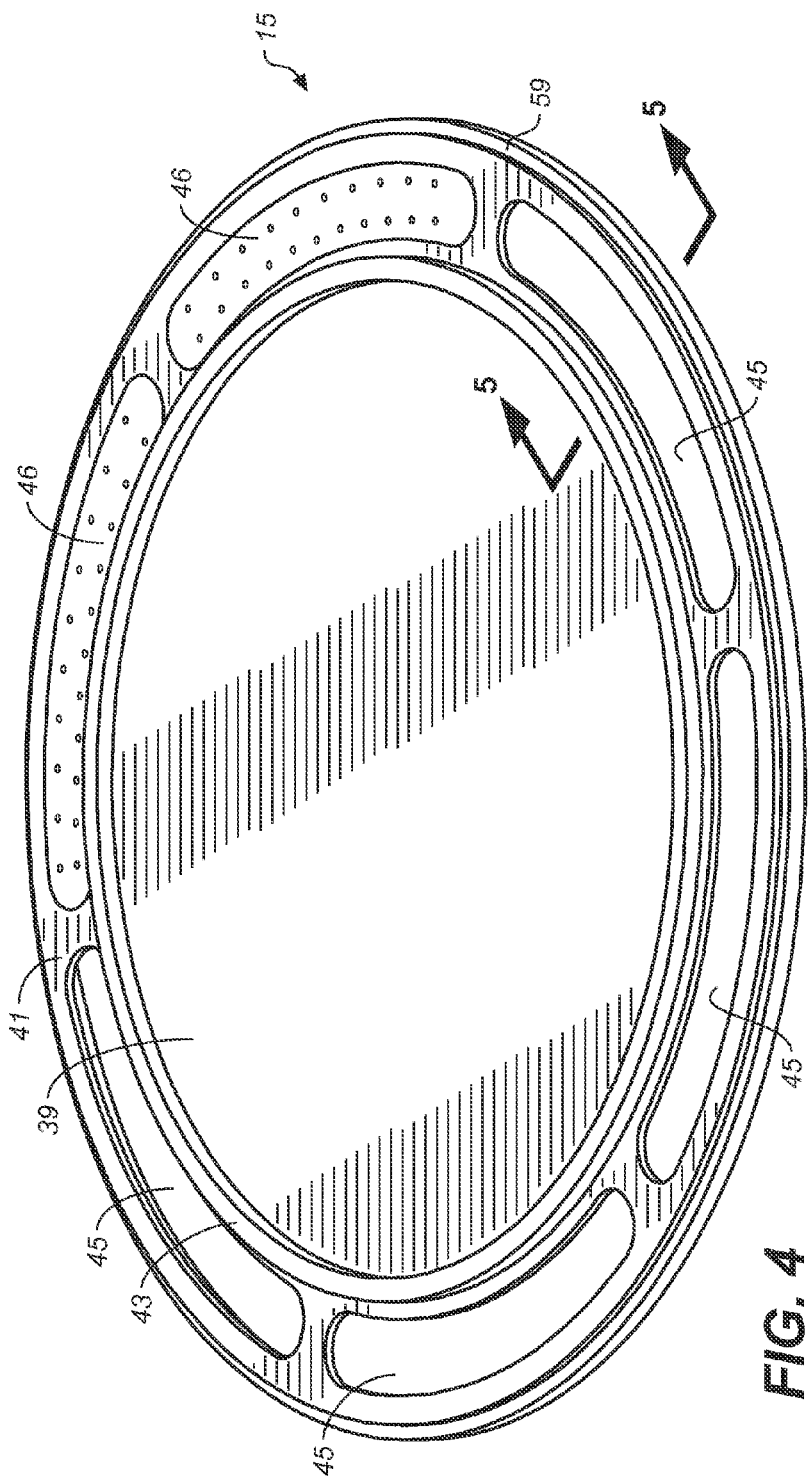
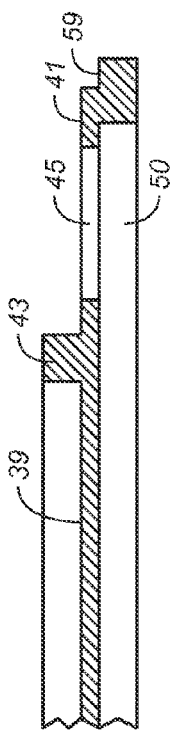
FIG. 4
FIG. 5

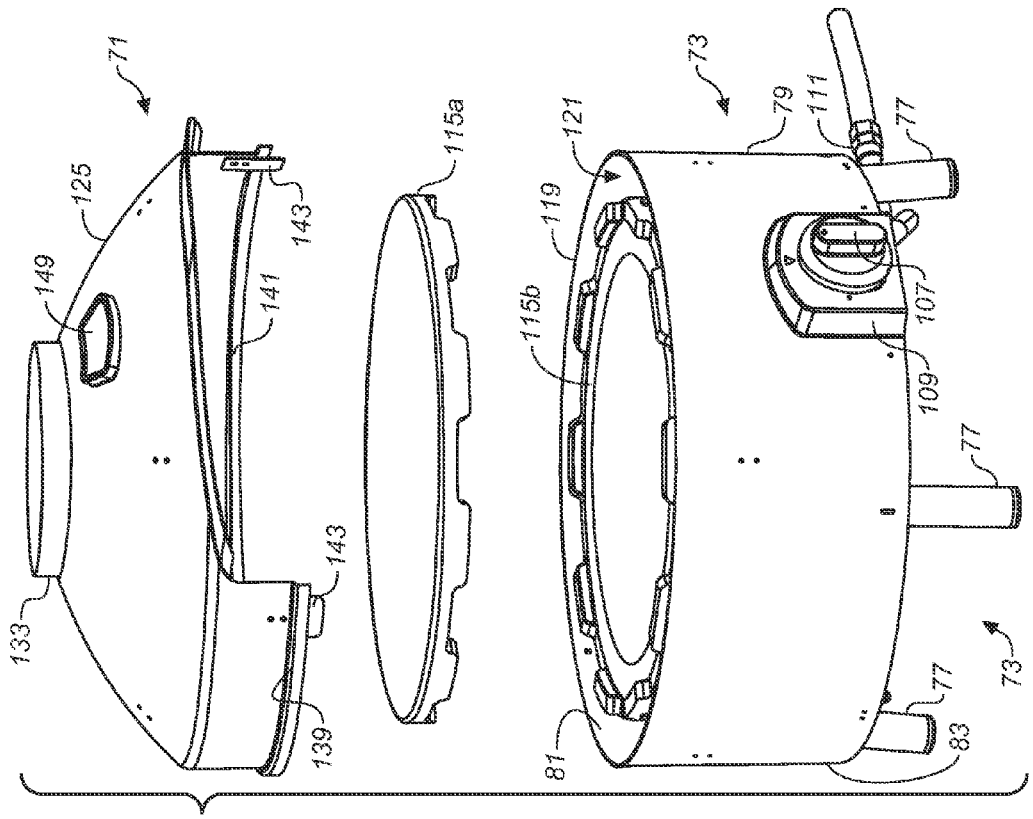
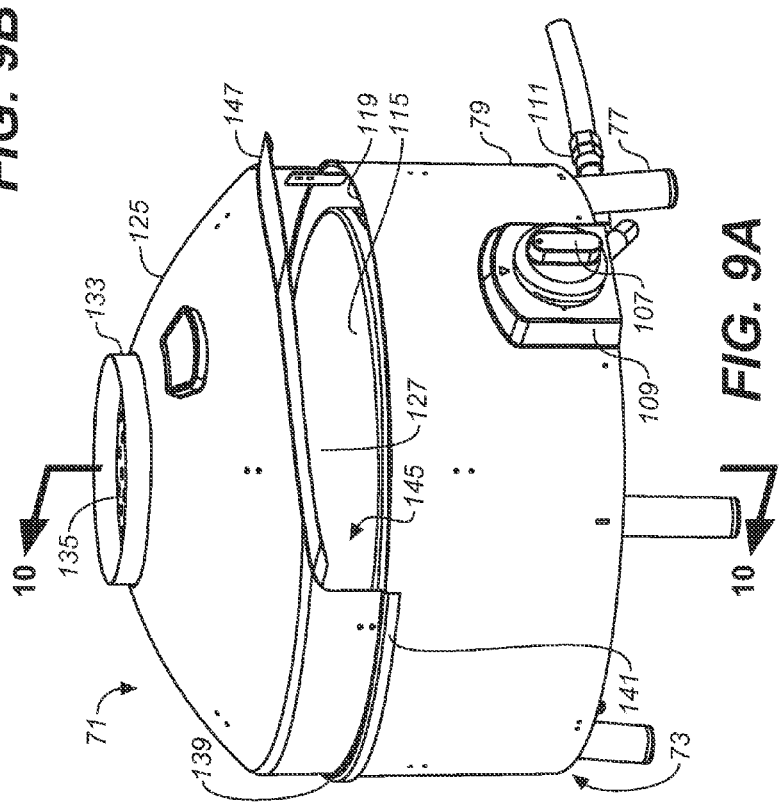

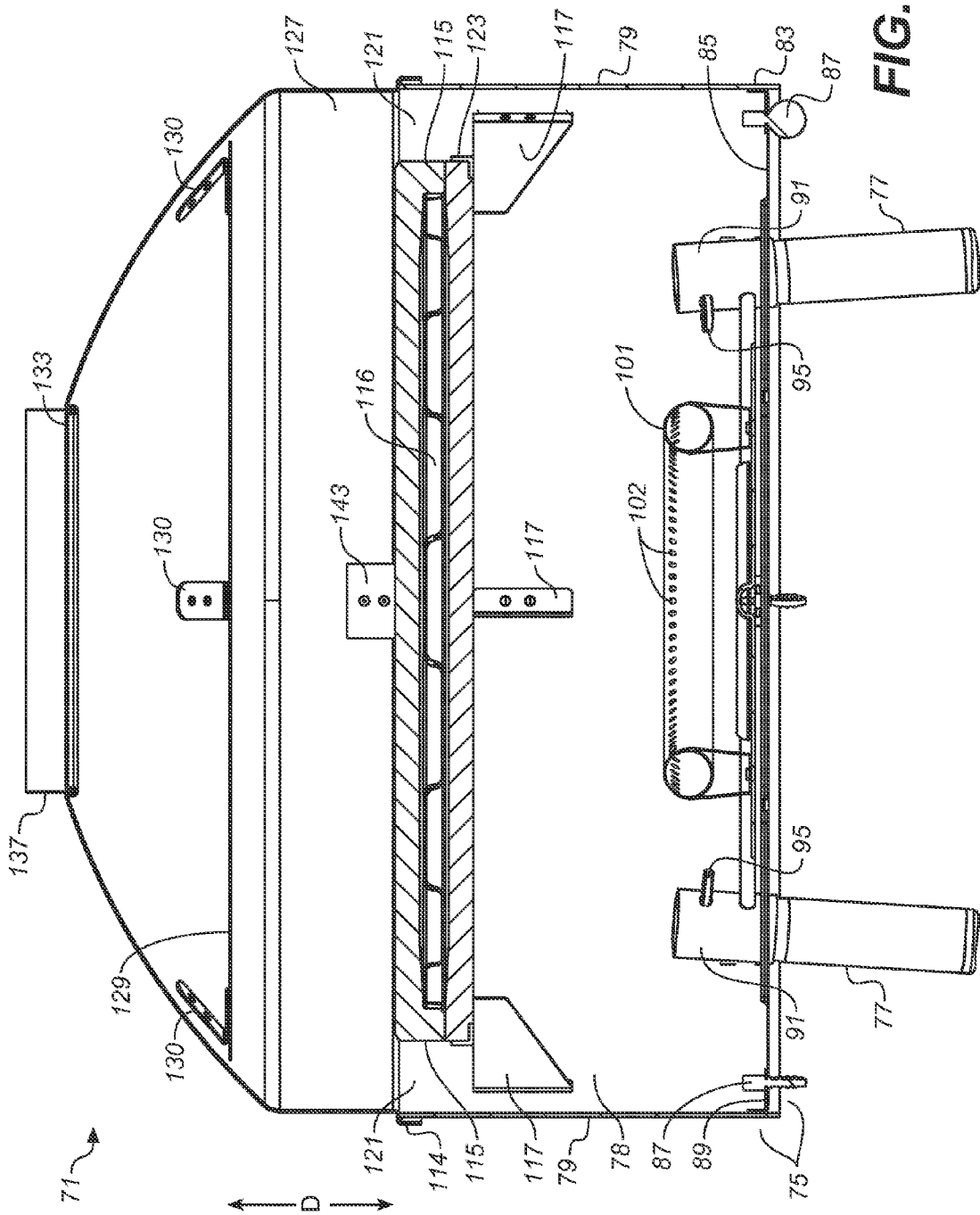

PORTABLE BAKING OVEN

CROSS-REFERENCE TO RELATED APPLICATIONS

The application claims the benefit of U.S. Provisional Patent Application No. 61/636,191 filed Apr. 20, 2012, which is incorporated herein by reference.

BACKGROUND OF INVENTION

The present invention generally relates to ovens used for cooking and baking and more particularly to ovens that are portable and that are particularly adapted to baking pizzas and other flat food items.

Portable ovens for baking pizzas are widely known. Typically, such ovens include a heat source below a flat stone or ceramic plate, often called a "pizza stone," on which the pizza is supported. The pizza stone has a high thermal mass and evenly and efficiently distributes the heat to the bottom of the pizza so that the bottom of the pizza is evenly baked. The problem with such conventional ovens is that, due to the substantial temperature differences between the pizza stone and the air above the pizza, the bottom of the pizza bakes more quickly than the top, causing the pizza to either be underdone on the top or overdone or burnt on the bottom.

U.S. Pat. No. 5,365,833 discloses a pizza baking pan that attempts to overcome the problem of uneven baking by providing a support plate for the pizza stone that allows heat from the heat source below the stone to circulate up into a covered region above the stone to raise the temperature above the pizza and accelerate baking of the pizza's top side. However, the approach disclosed in the '833 patent has disadvantages. First, it relies on a dome-shaped cover to trap heat circulated up to upper chamber formed beneath the dome. The dome-shaped cover traps heat circulated up from the heat source below the pizza stone, and does not efficiently and evenly concentrate the heat where it needs to be, namely, across the top of the pizza. The top of the pizza is typically wetter than the bottom crust, and thus needs more heat than the crust to bake. For example, where the bottom of the pizza may bake at 500 degrees Fahrenheit, the top may require 700 degrees to cook at the same rate. With a dome shaped cover it is found that the temperature rise at the top of the pizza is still insufficiently high to accelerate baking of the top of the pizza enough to keep up with the baking of the bottom of the pizza.

A second disadvantage of the dome shaped cover as taught by U.S. Pat. No. 5,365,833 is that the cover traps moisture given off by the pizza, which could cause the top of the pizza to become soggy and under-cooked.

The present invention overcomes the drawbacks of prior portable pizza ovens by providing a portable pizza oven that evenly bakes the top and bottom of the pizza, that bakes the top of the pizza to the same degree as the bottom of the pizza, and that prevents moisture emitted by the top of the pizza from causing the top of the pizza to become soggy and under-cooked. These advantages are achieved passively without adding additional heat sources to the oven.

SUMMARY OF THE INVENTION

The invention is directed to a baking oven for a pizza or other suitable food items, for example cookies, which circulates heat generated in a heating chamber in the base of the oven up into a top baking chamber above a heating plate supporting the food item being baked. The oven efficiently redirects the heat circulated to the baking chamber back down onto the food item resting on the heating plate so that the top of the food item is evenly heated. The efficient redirection of heat is accomplished without trapping moisture in the baking chamber.

In accordance with the invention, a heating plate, which can be a pizza stone, is supported above the heating chamber of the oven base. A top cover fits onto the base to form the baking chamber above the heating plate, and air passageway means around the perimeter edge of the heating plate thermally connect the heating chamber of the base to the baking chamber beneath the top cover and permit heat generated in the heating chamber to circulate up and around the heating plate into the baking chamber. The top cover has a heat reflector structure and at least one vent with at least one vent opening for venting moisture from the baking chamber. The heat reflector structure extends across the inside of the top cover and is positioned in the top cover so that it faces the food item heating plate when the cover is placed over the base. The reflector structure can be in the form of a substantially flat heat reflector plate, preferably oriented substantially parallel to the oven's heating plate, but could be provided in other structural forms adapted to reflect heat circulated up into the baking chamber of the oven back down onto the food item or items on the heating plate. The total area of the heat reflecting surface or surfaces of the top cover's heat reflecting structure generally needs to be sufficient to significantly raise the temperature of the food item resting on the heating plate.

The moisture vent in the top cover is preferably located above the heat reflector structure and the heat reflector structure in the top cover preferably has openings to allow moisture to pass though the reflector structure and out through the moisture vent. Preferably, the openings in the heat reflector structure are substantially evenly distributed over a substantial area of the structure. For best results, the total area of the openings in the heat reflector structure will approximately equal the total area of the vent opening or openings in the moisture vent in the top cover, however, this is not required.

In use, heat generated in the base of the baking oven is circulated to the baking chamber formed by the top cover through the air passageway or passageways provided around the heating plate. The heat circulated to the baking chamber is redirected to and over the top of a food item resting on the heating plate by the well-positioned heat reflector structure of the top cover. In the preferred embodiment, moisture emitted by the food item can be allowed to escape through the heat reflector structure where it can be vented from the oven through a moisture vent located in the cover above the reflector structure. It is also noted that, in addition to venting moisture, the moisture vent will create an air flow through the baking chamber. This air flow produces a chimney effect which will elevate the temperature within the baking chamber, thereby enhancing the ability of the oven to accelerate the baking of the top of the food item on the heating plate.

In another and separate aspect of the invention, a front access opening can be provided in the top cover of the oven to allow food items such as an uncooked pizza to be placed on the heating plate of the oven once it is preheated. An extender brim can be provided on top of the front access opening to inhibit heat loss through the front access opening. Preferably, the heat reflector structure is positioned near the top edge of the front access opening to minimize the spacing between the heat reflector structure and the food items on the food item heating plate. Means can be provided for allowing more of the heat produced in the heating chamber to circulate up into the baking chamber near the front access opening to compensate for heat loss through the front access opening. Examples of such means include differential sizing of air passageways around the heating plate or providing a heat source that produces more heat below the front access opening of the oven.

DESCRIPTION OF THE DRAWINGS

FIG. 1A is a top perspective view of a portable baking oven in accordance with the invention.

FIG. 1B is another top perspective view thereof with the top cover removed.

FIG. 1C is an exploded top perspective view thereof.

FIG. 4 is a top perspective view of the heating plate of the baking oven shown in FIGS. 1-3.

FIG. 5 is a fragmentary cross-sectional view thereof taken along section lines 5-5 in FIG. 4.

FIG. 9A is a top perspective view of another embodiment of a portable baking oven in accordance with the invention.

FIG. 9B is a partially exploded view thereof.

FIG. 10 is a cross-sectional view thereof taken along lines 10-10 in FIG. 9A.

DETAILED DESCRIPTION OF THE ILLUSTRATED EMBODIMENTS

Figure 2:
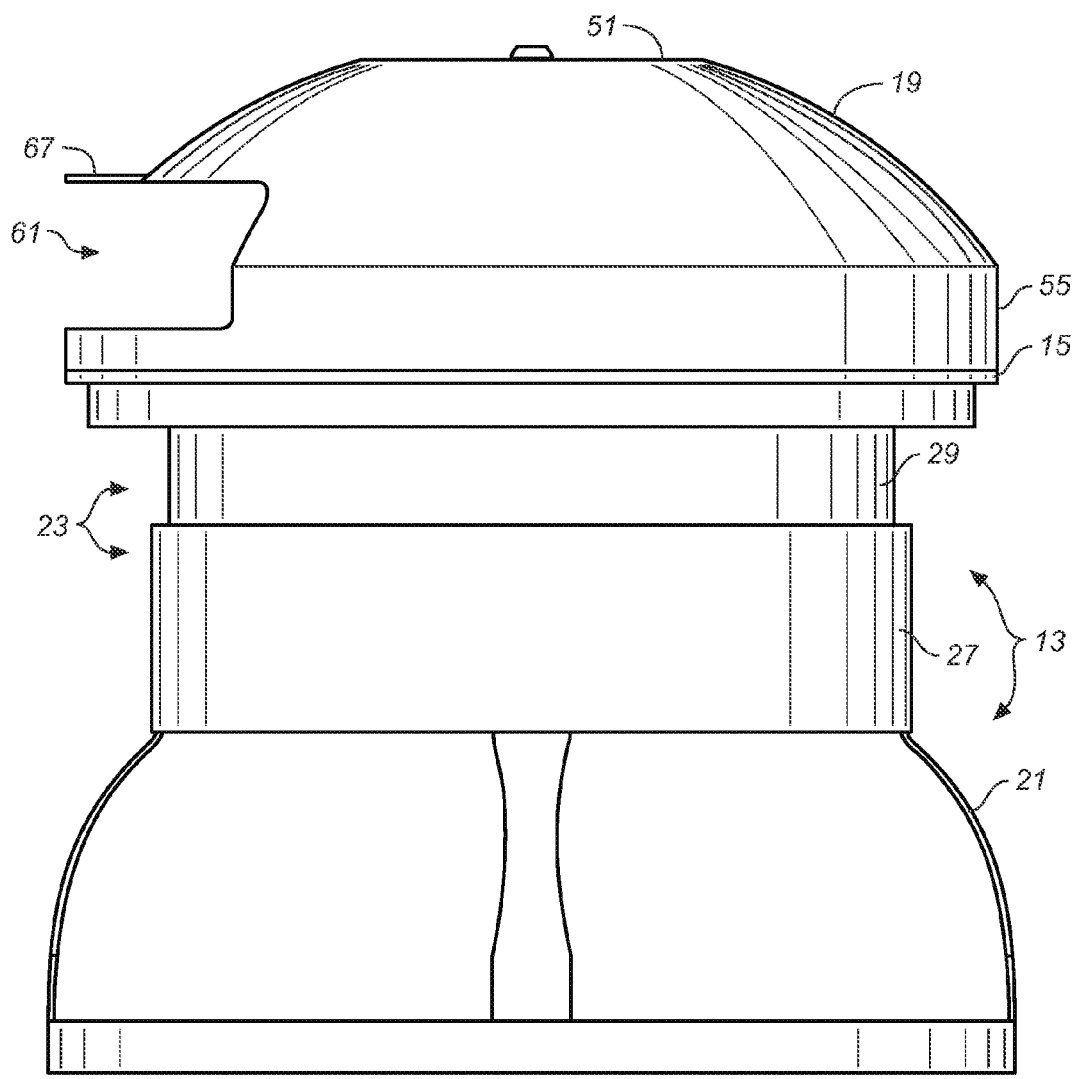
FIG. 2 is a right side elevational view thereof.
Figure 3:
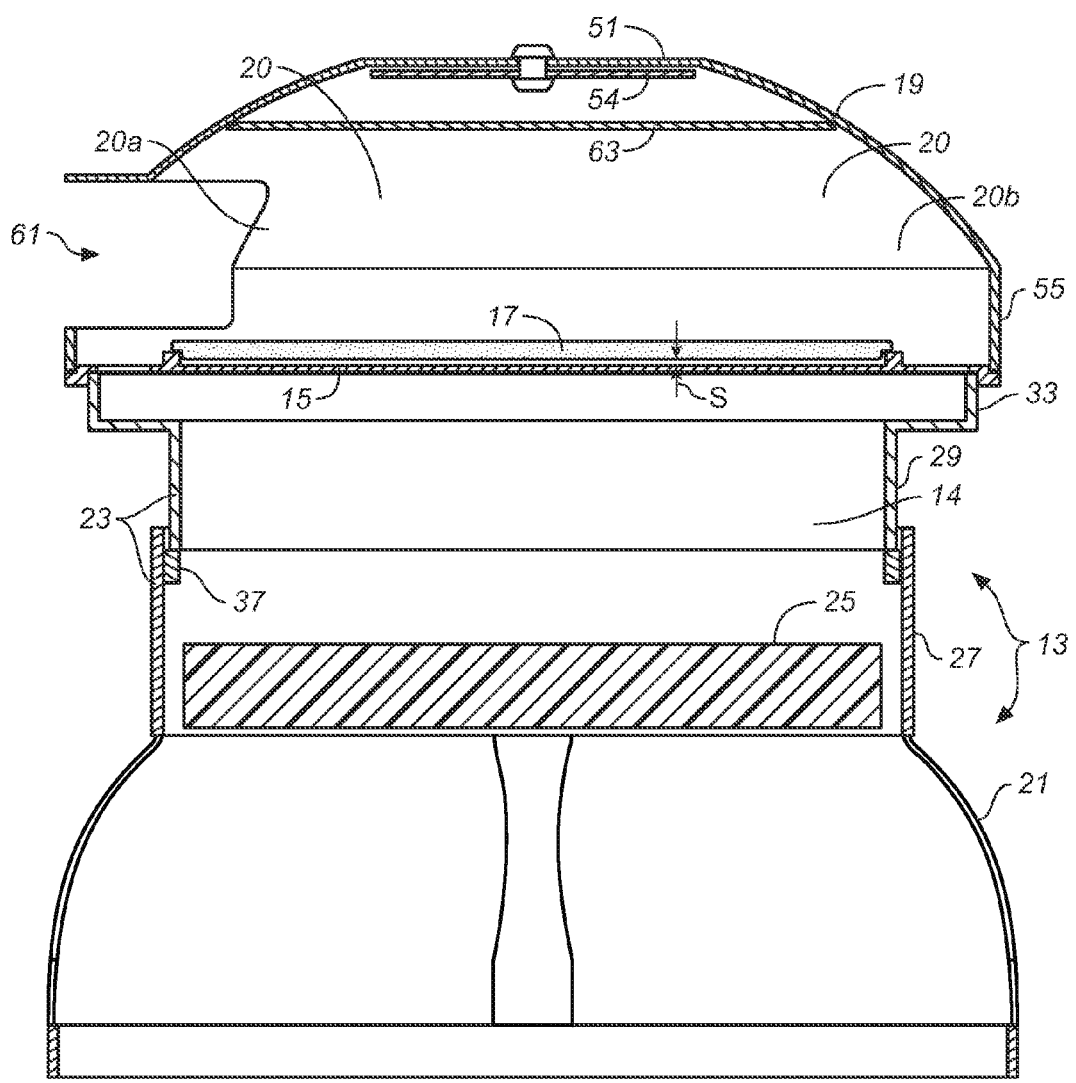
FIG. 3 is a cross-sectional view thereof in side elevation taken along lines 3-3 in FIG. 1A.
Figure 6:
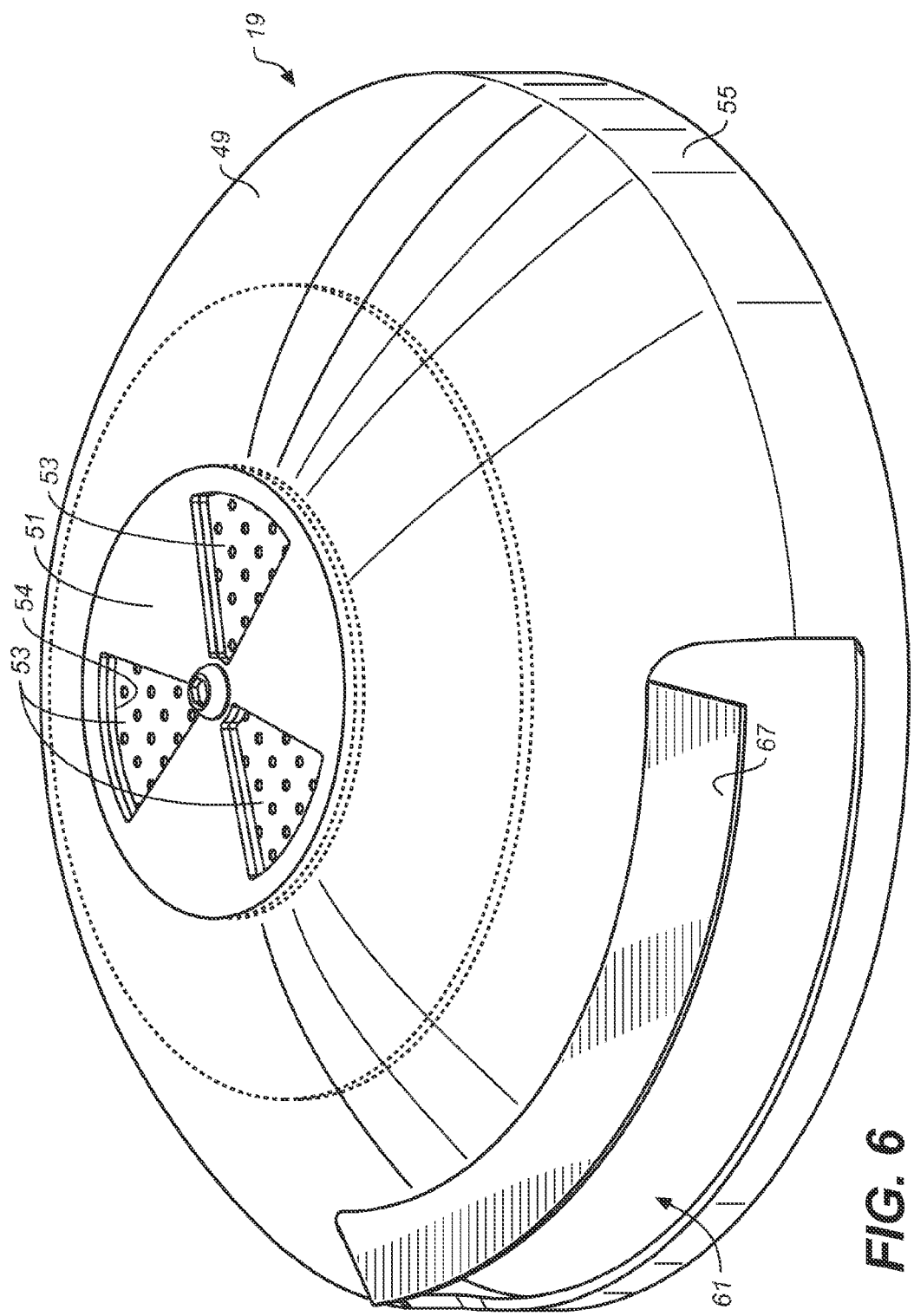
FIG. 6 is a top perspective view of the top cover of the baking oven shown in FIGS. 1-3.
Figure 7:
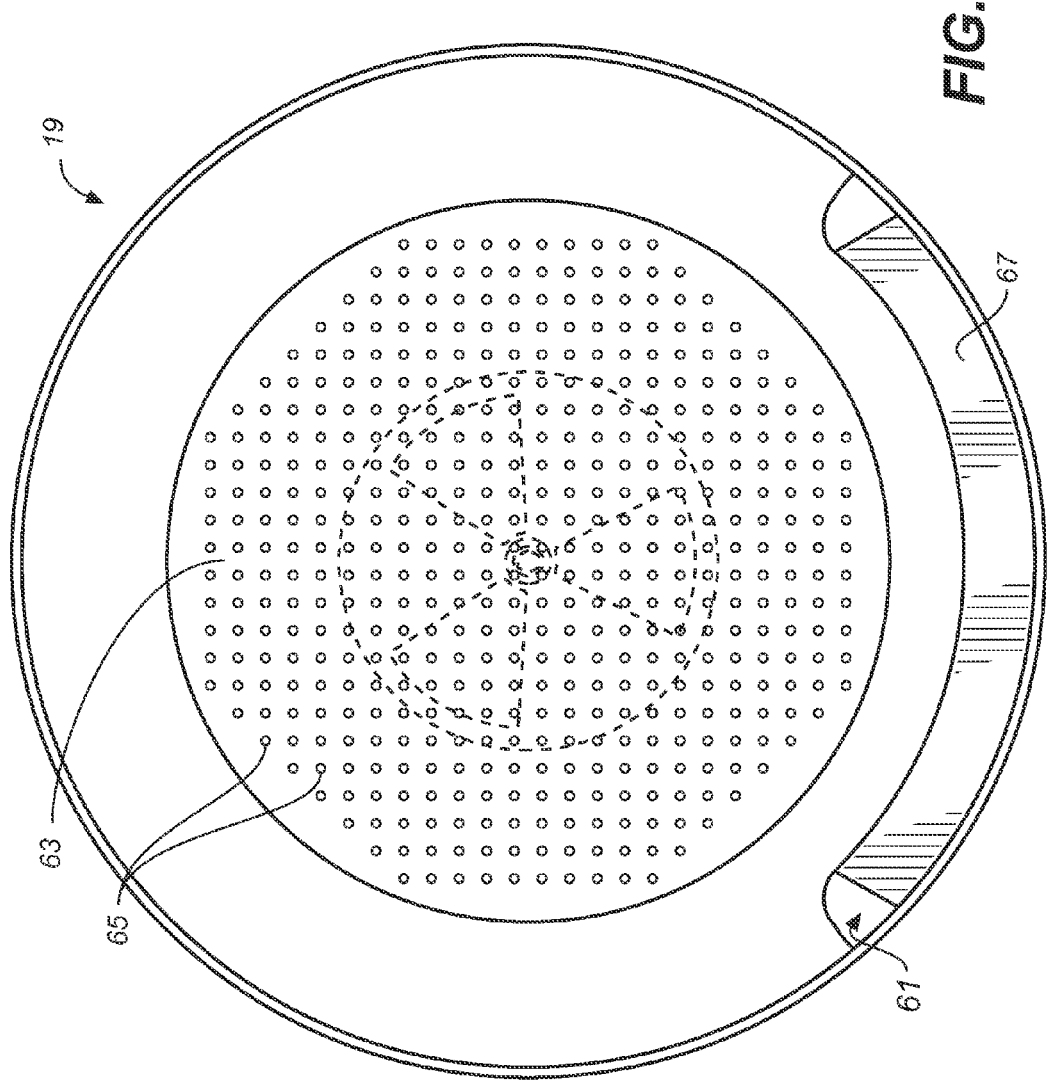
FIG. 7 is a bottom plan view thereof.

Referring now to the drawings, FIGS. 1-8 illustrate a first embodiment of a portable baking oven in accordance with the invention. The basic elements of the baking oven, denoted by the numeral 11, are a base 13 having a heating chamber 14 (see FIG. 3), a food item heating plate 17 and a top cover 19 having novel heat reflecting capabilities as hereinafter described. When placed on the base, the top cover forms an upper baking chamber 20 (again see FIG. 3) above the heating plate, which also as hereinafter described is in thermal communication with the heating chamber of the base.

The base 13 has means for supporting the oven's heating plate above its heating chamber 14. In this illustrated embodiment, the heating plate support means is in the form of support plate 15 located at the top portion of the base; however, as later described, the heating plate could be supported over the base's heating chamber by other structural means.

The oven base 13 in this embodiment is further comprised of a lower stand portion 21 and body portion having a bottom wall 14 and an upright cylindrical ring wall section 23. The body portion houses a heat source such as burner 25 shown in FIGS. 3 and 8. The burner is suitably a gas burner fed by a gas source (not shown) such as a propane tank, or it could be an electric burner. The ring wall section can include a lower ring wall portion 27 extending upwardly from lower stand 21, and an upper detachable ring wall portion 29 having a smaller diameter bottom end 31 and a stepped up larger diameter top end 33 having a top support edge 35. The bottom end of the detachable upper ring portion is sized to fit within the lower ring wall portion of the assembly, where it can rest on a shoulder rib 37 formed on or attached to the lower cylindrical wall.

By providing the upright ring wall section in separable parts, the base of the oven can be broken down into smaller height parts for ease of storage and shipping. However, it will be understood that ring wall section 23 could be fabricated as a unitary part with a larger diameter top end 33. Or it could be a ring wall having the same diameter from bottom to top, or having different stepped configurations, so long as it has a sufficient diameter (or other lateral dimension if having a shape other than a cylindrical shape) to accommodate the burner and to provide an adequately sized heating chamber to heat the underside of the support plate 15. It should also be able to hold the support plate and provide for heat flow through the perimeter of the support plate as hereinafter described.

With further reference to FIGS. 1-8, the illustrated support plate 15 is seen to have a heat conductive center portion 39 and an outer perimeter portion 41, and is sized to rest on the top support edge 35 of the upper ring wall of the base's upper ring support section. The support plate can be fabricated as a single heat conductive part, such as a steel part.

As best seen in FIGS. 4 and 5, the top of the support plate's center portion can be provided with means for centering the heating plate 17 on the support plate. This centering means is suitably in the form of a raised ridge structure, such as circular ridge 43, for supporting and centering the heating plate 17 when it is placed on the support plate. The outer perimeter portion of the support plate, which lies outside the raised ridge, is not covered by the heating plate. This outer perimeter portion is provided with air passageways which thermally connect the heating chamber 14 of the base of the oven to the baking chamber 20 above the heating plate. These air passageways allow heat generated in the heating chamber to circulate up into the baking chamber. The air passageways can be differently sized to regulate the amount of heat entering one side of the cooking chamber versus another side of the cooking chamber. In the illustrated embodiment, the passageways are comprised of large front and side slots 45 and areas of small rear perforations 46. The smaller perforations will restrict the amount of heat passing through this region of the support plate, a feature that can be advantageously used to correct imbalances in the temperature within the baking chamber caused by the below described front access opening in the oven's top cover.

A bottom recess 50 can be provided in the underside of the support plate. This recess is sized to accommodate the top end 33 of the upper ring wall 29 when the support plate is placed on top of the ring wall, and will cause the support plate to be centered on the ring wall.

The food item heating plate 17, which is supported on the support plate of the base, can be stone, ceramic or other material having a high thermal mass. The perimeter edge 18 of the heating plate can be a stepped edge and the heating plate can be sized so that this edge overlaps the raised circular ridge 43 on the base's support plate. The thickness of the heating plate can be chosen so that the heating plate is supported along its edge by the raised rib structure, and so that the bottom of the heating plate does not contact the center portion of the support plate. This creates an air gap 16 between the heating plate and the support plate and permits the temperature of the heating plate, and thus the baking temperature of the bottom of the food item, to be lowered in conjunction with raising the temperature of the top of the food item as hereinafter described. It is found that creating an air gap with a support plate to heating plate spacing, denoted "S" is FIG. 8, of approximately ⅛ inch can be effective in keeping the temperature of the heating plate within optimal ranges.

The illustrated top cover 19 of oven 11 has a dome portion formed by upwardly and inwardly extending dome walls 49 and a perforated top area 51, which is suitably flat. The perforated top area of the cover's dome portion forms a moisture vent 53, which can have a rotatable vent plate 54 for closing the vent when the oven is being preheated. The illustrated top cover further includes a bottom rim skirt 55 that extends downwardly from the dome walls. This rim skirt is sized to contact the outer edge 57 of support plate 15 when the top cover 19 is placed on support plate. A rim slot 59 can be provided on the outer edge of the support plate to receive the cover's rim skirt and to keep the cover centered on the support plate.

The top cover of the oven has a front access opening 61 of a suitable size to allow a food item such as a pizza to be placed in and removed from the oven without removing the cover. This front opening will also allow the user to monitor the doneness of the food item being baked. Also, by leaving the cover on, the temperature of the oven can be maintained as food items are inserted and removed from the oven.

The oven's top cover 19 is provided with a heat reflector structure that extends across the inside of the top cover and that will lie generally in the plane of the food item heating plate when the top cover of the oven is placed on the oven base. The illustrated heat reflector structure is in the form of a heat reflector plate 63, which is fabricated of a material such as steel capable of efficiently reflecting heat. The reflector plate is contained entirely within the cover and can be secured to the cover's side walls 49. It is positioned within the top cover so that it faces the oven's heating plate 17, and generally it is desirable to position it as close to the heating plate as possible without impeding access to the baking chamber through access opening 61. Generally and as further discussed below, the reflector plate to heating plate distance, denoted "D" in FIG. 8, will determine how effective the reflector plate will be in elevating the temperature of the top of the food item resting on the heating plate.

Reflector plate 63 is preferably oriented parallel to heating plate 15 and is provided with openings 65, preferably in the form of perforations that are substantially evenly distributed over the reflector plate. Generally, it is desirable that the perforated area of the reflector plate extends over most of the heating plate. It is found that best results can be achieved when the total area of the openings in the reflector plate is approximately equal to the total area of the openings in the top cover's moisture vent 53.

It is noted that some heat circulated up into the oven's baking chamber 20 will be able to escape through the front access opening 61 of the top cover 19, causing some imbalance in temperature between the baking chamber's front region 20a near the front access opening and its back region 20b opposite the front access opening. To equalize the temperature imbalance, the smaller perforated areas 46 in the perimeter portion of the support plate are oriented to the back region 20b of the baking chamber away from the access opening. It has also been found that heat loss through the front access opening can be reduced by providing an extender brim 67 that extends horizontally outward from the top of the access opening. It can be seen that front access opening 61 extends up into the cover's upwardly and inwardly extending curved dome walls 49 such that the top edge of the access opening is recessed back from the outer diameter of the cover. Suitably, brim 67 will extend out from this recessed top edge to approximately the diameter of the cover's rim skirt 55.

Figure 8:
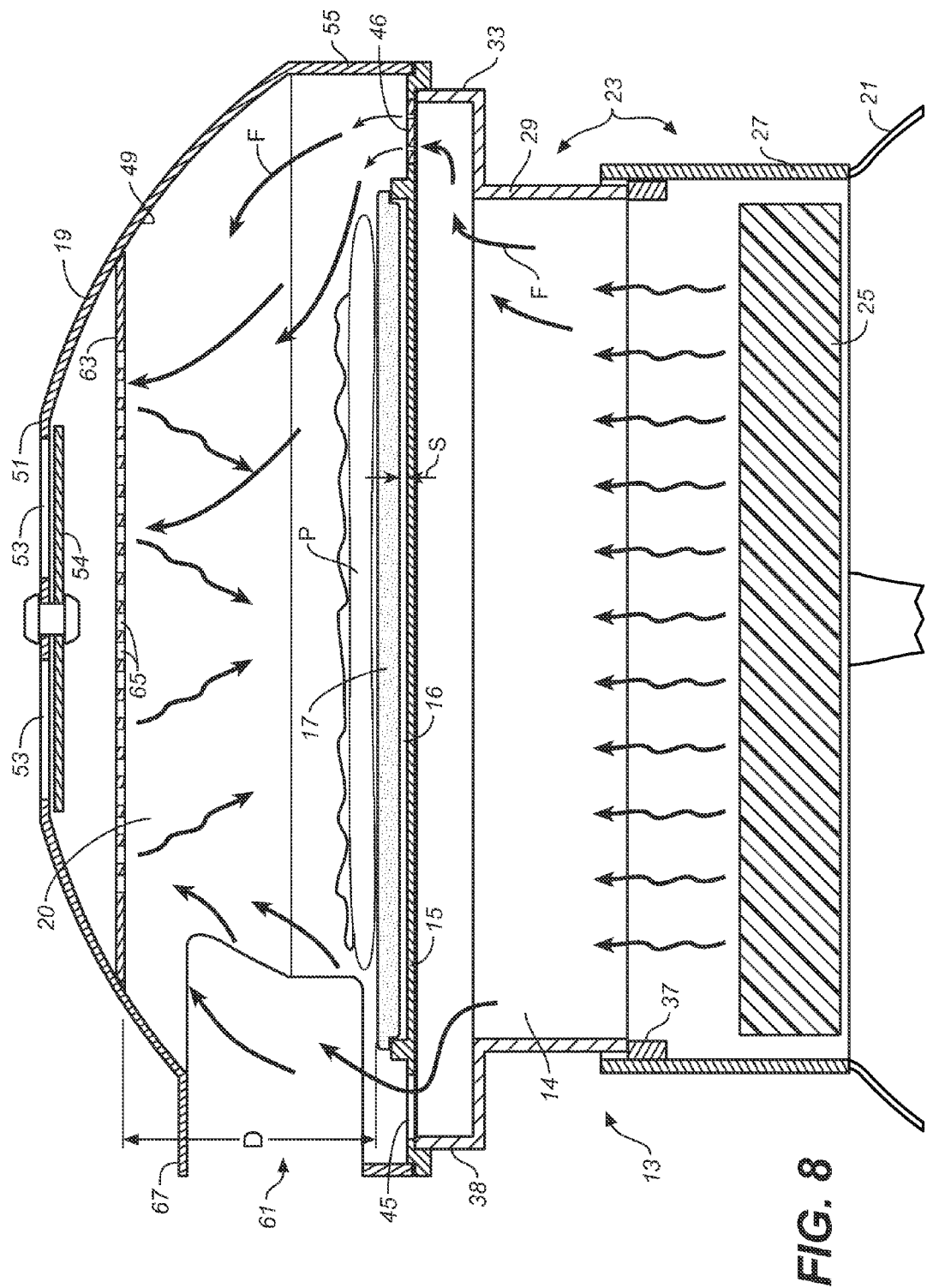
FIG. 8 is a cross-sectional view of the oven in side elevation showing heat flow within the baking oven.
Figure 11:
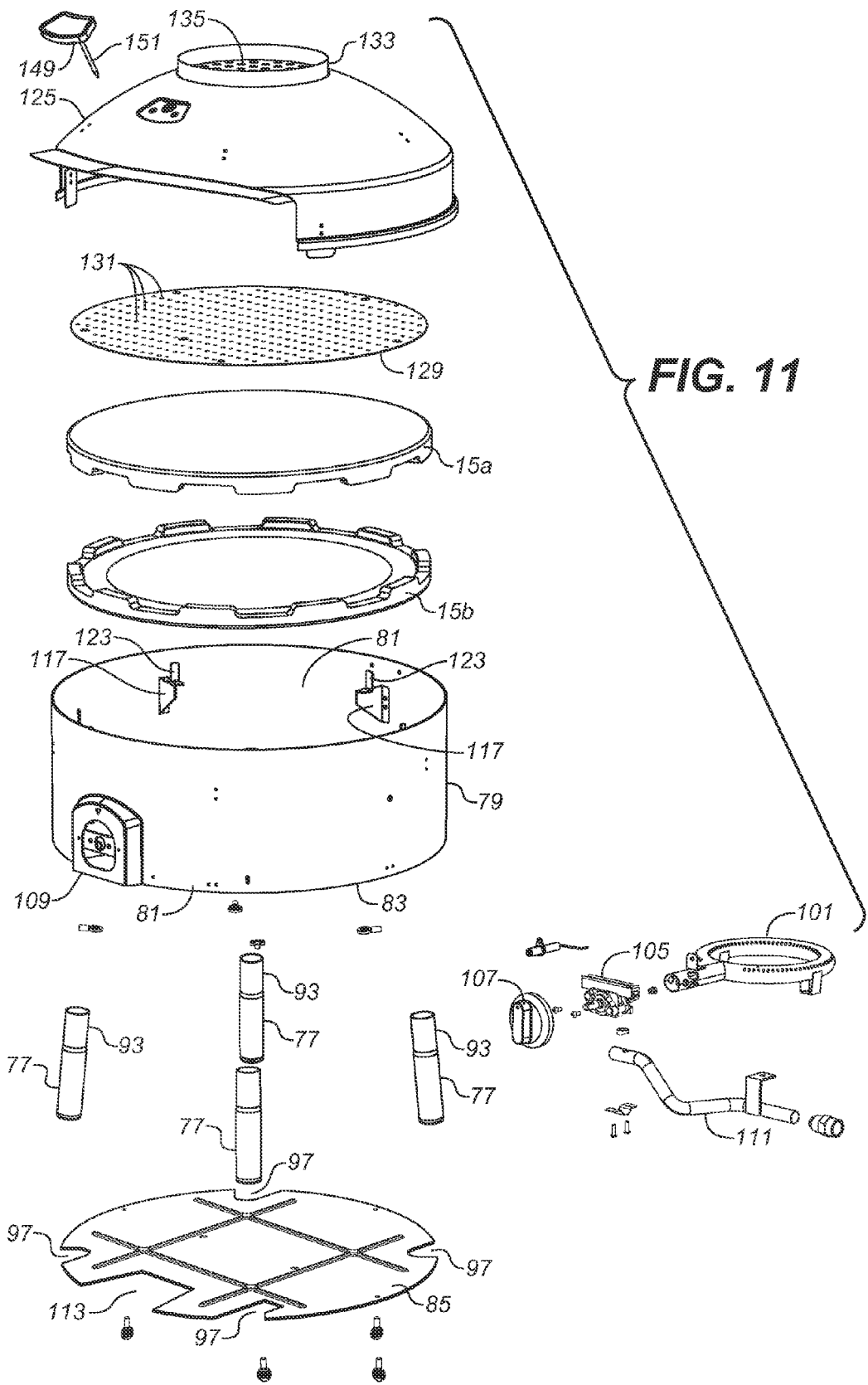
FIG. 11 is a fully exploded view thereof.
Figure 12:
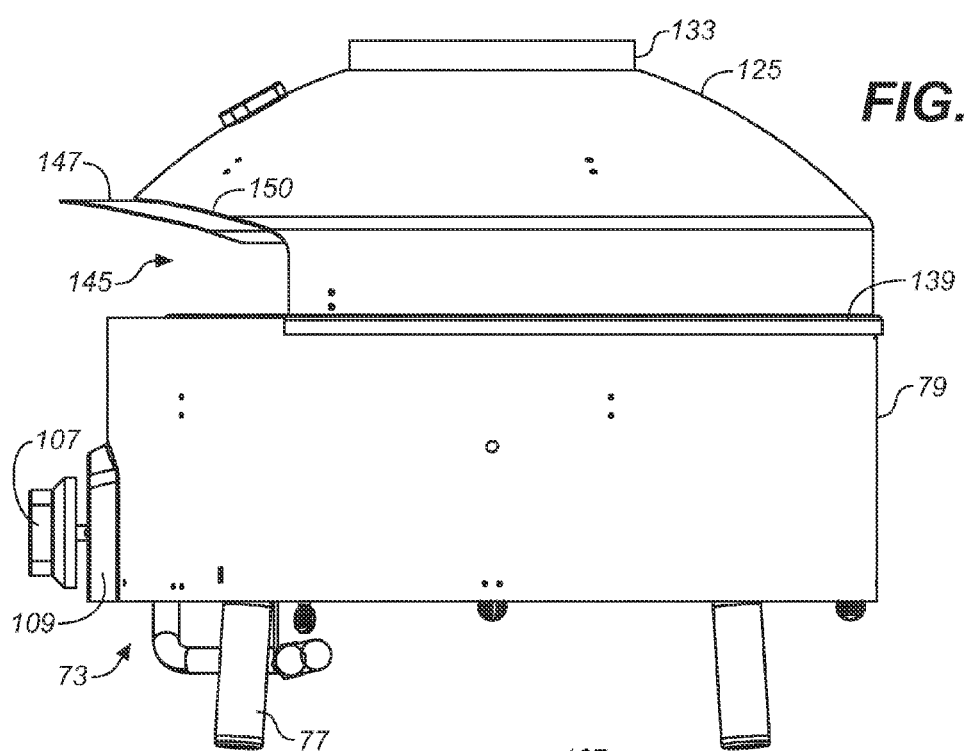
FIG. 12 is a side elevational view thereof.
Figure 14:
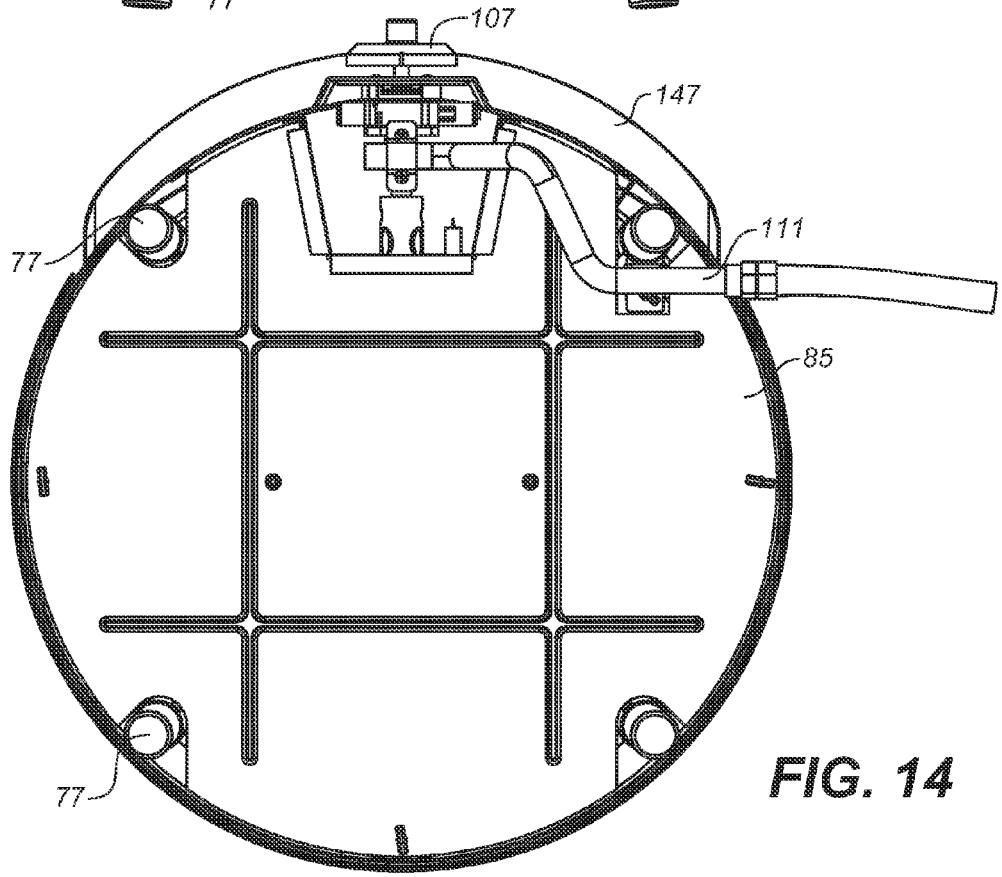
FIG. 14 is a bottom plan view thereof.
Figure 13:
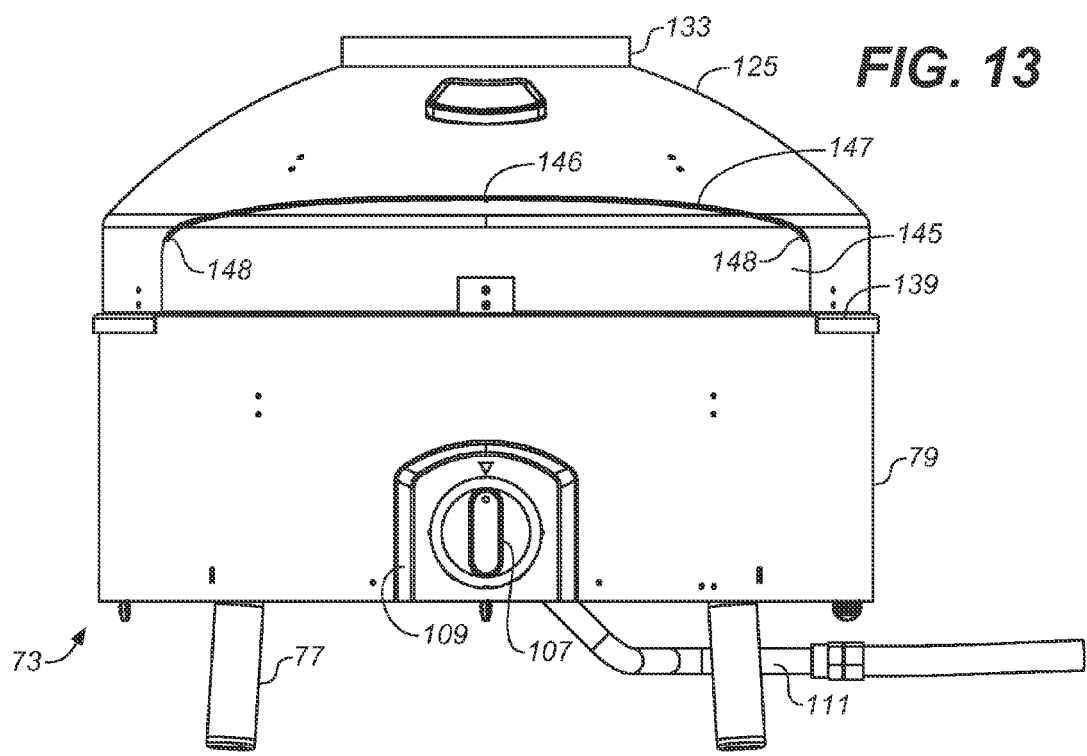
FIG. 13 is a front elevational view thereof.
Figure 15:
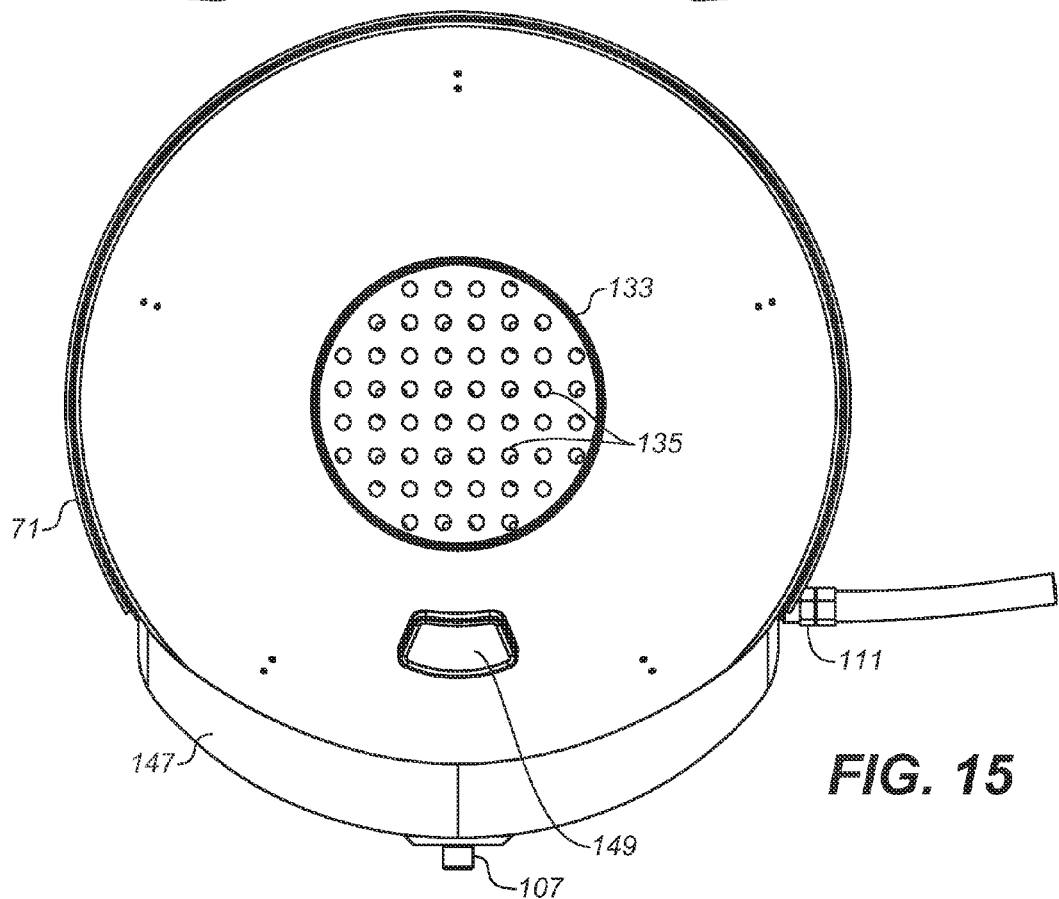
FIG. 15 is a top plan view thereof.

The use and operation of the illustrated pizza oven is described in reference to FIG. 8. First, the oven base of the oven can be assembled by placing the upper ring wall 29 of the base's upright ring wall section 23 into the lower ring wall 27 so that it rests on the shoulder rib 37 of the lower ring wall. The support plate 15 can then be placed on top of the ring support section to complete the base of the oven. The food item heating plate 17, typically a pizza stone, is then placed on the base's support plate such that it is centered by the plate's circular raised ridge 43. After the top cover is placed on the base, the burner 25 can be turned on. When the burner is turned on, heat produced in heating chamber 14 in the oven base will heat the heating plate; it will also circulate around the perimeter edges of the heating plate into the upper baking chamber as indicated by the heat flow arrows "F" in FIG. 8 by circulating up through the perimeter portion 41 of support plate 15. Due to the variation in the size of openings 45, 46 in the perimeter portion of the support plate, heat flow will be unbalanced front to back, with more heat being circulated into the front of the baking chamber near the front access opening 61 to compensate for the loss of heat through the access opening.

Once the oven has been preheated, that is, once the heating plate and baking chamber have been brought up to temperature, a pizza "P" (or other relatively thin food items such as cookie dough) can be placed on the heating plate through the cover's front access opening 61 using a utensil such as a long handle spatula or pizza peel. Upon placement on the heating plate, the top of the pizza or other food item will be heated more quickly due to convection and radiant heat redirected to the top of the food item by the reflector plate 63. The bottom of the food item will be baked more slowly due to controlled conduction heating delivered to the bottom of the food item through the heating plate. At the same time, moisture emitted by the food item(s) will be allowed to escape from the confined volume of the baking chamber created by the cover's heat reflector plate. The moisture is allowed to escape through the openings in the heat reflector plate and the moisture vent above the reflector plate.

FIGS. 9A-15 illustrate an alternative embodiment of a portable baking oven in accordance the invention, wherein an alternative and simplified structure is provided for supporting the oven's heating plate and wherein the heating plate is of a novel two part design for providing an air gap in the plate for better controlling the temperature of the plate. FIGS. 9A-15 also show an alternative version of the moisture vent in the top area of the cover for the oven and an exemplary configuration for the burner in the base of the oven.

In this embodiment, oven 71 has a base 73 comprised of a body portion 75 and legs 77. The body portion, which contains the oven's heating chamber 78, includes a single upright, preferably cylindrical ring wall section 79 with an open top 81 and a bottom 83. A bottom plate 85 can be removably fastened to the bottom of the upright ring wall section by suitable fasteners such as thumb screws 87, which can be screwed into inwardly projecting tabs 89 or other suitable anchoring structures around the bottom perimeter of the ring wall section. Legs 77 can similarly be attached to the bottom of the ring wall section. In the illustrated embodiment, legs 77 are attached to the ring wall section 79 by means of short retaining tubes 91 attached, such as by spot welding, at spaced locations around the bottom inside of the ring wall. The retaining tubes 91 are sized to allow the slightly smaller diameter top ends 93 of the legs to slide into the tubes, whereupon they can be fastened in place by fasteners 95, which can also be thumb screws. Carve-outs 97 in the perimeter edge of bottom plate 85 accommodate the legs, which can be installed before the bottom plate is installed.

The burner for oven 71 is shown as a gas burner assembly comprised of burner element 101, electronic igniter 103, a burner control 105, and a burner control knob 107. The burner assembly is supported by and extends inwardly from the ring wall 79, and more specifically from a mounting plate 109 on the outside of the ring wall. (The control knob 107 for the burner is on the outside of the mounting plate so as to be user accessible.) A gas line 111 from an external gas source extends through the bottom plate carve-out 113 and is connected to the burner.

In this embodiment a two-part heating plate 115 having matching upper plate portion 115a and lower plate portion 115b is supported at the top of the upright cylinder wall section 79 by a heating plate support means in the form of plate support brackets 117 secured to the inside of the upright cylinder wall. Suitably, four plate support brackets are provided ninety degrees apart around the inner circumference of the cylinder wall immediately below the cylinder wall section's top rim 119; however, it will be understood that fewer or more brackets could be used. The heating plate has a smaller diameter than the inside diameter of the base's ring wall such that a passageway 121 is created between the ring wall and the heating plate's outer edge 116. Centering means can be provided for centering the bracket-supported heating plate within the cylinder wall section so that the width of the air passageway is substantially uniform around the heating plate. Suitably, the centering means can be in the form of upright centering tabs 123 placed on top of brackets 117 inboard the cylinder wall to which the brackets are attached.

The diameter of the heating plate relative to the diameter of the cylinder wall section is suitably chosen to provide an air passageway having a suitable width to promote efficient circulation of heat from the base heating chamber 78 up into the baking chamber above the heating plate. An air passageway having a width of about 1 to 1½ inches is considered suitable for this purpose based on an oven having a base diameter of about 16 inches. Reducing the diameter of the heating plate to create a wider air passageway is possible but would compromise the available cooking surface area on the heating plate.

As with the previously described embodiment, the top cover 125 in this embodiment forms an upper baking chamber (denoted 127 in FIG. 10) above the heating plate, and has a heat reflector structure in the form of heat reflector plate 129. As in the previously described embodiment, heat reflector plate 129 faces the heating plate supported on the base for reflecting heat back toward food items on the heating plate. And as in the previous embodiment, openings or perforations 131 in the reflector plate allow moisture to be vented out of the oven's baking chamber through the moisture vent 133 in a top area of the cover. Vent 133 has vent openings 135 and in this embodiment additionally has a short vertical chimney wall 137 surrounding the chimney openings, which acts to improve the draw of the vent and its ability to vent moisture from the baking chamber. In this case a closure mechanism for the chimney is not shown, but could be optionally provided.

It is seen that the top cover 125 in this embodiment sets directly on the ring wall's top rim 119, instead of on a separate supporting plate structure, which in this case has been eliminated. The bottom rim 139 of the cover has a step edge 141 and inside retaining tabs 143 for fitting together the rims of the ring wall and cover and for keeping the cover from sliding off the base of the oven.

When the cover is in place, food items can be inserted into the oven and set onto the heating plate of the oven through the cover's front access opening 145. As in the previously described embodiment, this front access opening has a horizontal extender brim 147 for reducing heat loss through the opening. The front access opening is preferably dimensioned to be as small as possible without inhibiting the ability to slide flat food items such as a pizza or cookie dough into the oven. It can be seen that the height of the front access opening can vary somewhat from the center 146 of the opening to the ends 148 of the opening, but preferably this variation is kept relatively small, preferably within about ½ inch, to maintain side-to-side accessibility. Suitably, the height of the front access opening at its center and as measured from the cover's bottom rim 139 to the top edge 150 of the access opening is at least about 2 inches and preferably no more than about 3 inches, and still more preferably no more than about 2½ inches. The length of the extender brim 147 can suitably be between about 1¼ and 1⅝ inches with the brim length at the center of the access opening suitably being somewhat shorter than the ends of the opening.

As mentioned in connection with the embodiment illustrated in FIGS. 1-8 of the drawings, the presence of the front access opening 145 in the top cover will result in a loss of heat from the oven's baking chamber when the oven is being used. This can create an imbalance in the temperature from the front to the back of the heating chamber. In the embodiment of FIGS. 1-8, this temperature imbalance is overcome by varying the size of the air passageway to increase the amount of heat that can be circulated into the oven's baking heat in the back as compared to the front. In the embodiment shown in FIGS. 9A-15, where the air passageway is uniformly configured around the supported food item heating plate, this imbalance is overcome by providing a heat source that produces more heat in the front of the base's heating chamber as compared to the back. In reference to the gas burner illustrated in FIG. 10, this unbalanced production of heat can be produced by providing a gas burner 101 with gas openings 102 that are larger toward the front of the oven (denoted 71a in FIG. 9A) than the openings in the burner that are toward the back of the oven (denoted 71b in FIG. 9A).

As above-mentioned, the reflector plate, which is suitably attached to the inside of the top cover by mounting brackets 130, is preferably positioned as close to the heating plate as possible without overly impeding the user's accessibility to the baking chamber of the oven. Thus, the preferred placement of the reflector plate is at a level that places it near the top of the cover's front access opening 145, that is either at or just above or below the top edge 150 of the front access opening at the center 146 of the opening. Generally, the distance "D" between the reflector plate and the heating plate is no more than about 3½ inches, and no less than about 2 inches, and preferably between about 2¼ and 3 inches. These preferred distances are based on an oven having an overall diameter of around 16 to 17 inches (and a 14 inch cooking surface on the heating plate) and a height (excluding a stand or legs) of around 12 inches. However, it is contemplated that the oven can be scaled up in size where the preferred size of the access opening and the preferred distance between the reflector plate and heating plate are similarly scaled up in size to allow larger food items to be inserted into the oven.

The portable baking oven shown in FIGS. 9A-15 is used in much the same manner as the embodiment illustrated in FIGS. 1-8 described above, except that the ring wall section of the base does not come in separate parts that have to be assembled. It is noted that in the embodiment shown in FIGS. 9A-15, the top cover 125 of the baking oven has a temperature gauge 149, so that the user can monitor the temperature within the baking chamber and knows when the temperature is high enough to insert the food item into the oven. Gauge 149 is suitably positioned on the cover's upper curved dome wall for easy visibility, placing it above the reflector plate 129 inside the cover. Thus, the temperature probe 151 for the gauge should be long enough to extend through the reflector plate so as to measure temperature within the baking chamber below the reflector. An extra accommodation hole (not shown) can be provided in the reflector plate for this purpose. When the user sees that the temperature within the baking chamber has stabilized, the pizza (or other food item) can be inserted into the oven, where radiant heat coming off the top cover's reflector plate will accelerate the baking of the top of a pizza (or other food item) so that the top and bottom of the pizza are more evenly baked.

While different embodiments of the invention have been described in considerable detail in the foregoing specification and accompanying drawings, it shall be understood that it is not intended that the invention be limited to such detail, and that variations of the above-described embodiments are possible that are within the scope and spirit of the invention. For example, instead of being fabricated as a single reflector plate as illustrated, the heat reflector structure contained within the top cover of the oven could instead be fabricated in sections, each of which is attached to the inside of the cover so as to provide heat reflective surfaces having separation gaps which act as openings through which moisture can be vented. Or the heat reflector structure could be in the form of a series of spaced apart metal bars or louvers attached to and extending across the inside of the top cover at a suitable height above the bottom rim of the top cover. Preferably, the heat reflector structure will lie in substantially the same plane as the food item heating plate when the cover is placed onto the base of the oven; however, it will be understood that the structure's heat reflecting surface can be made up of a plurality of individual surfaces that are not parallel to the food item heating plate, but which cumulatively reflect heat back toward the top of the food items. Examples of such surfaces would be prismatic surfaces and louvered surfaces. The total area of the heat reflecting surface or surfaces of the top cover's heat reflecting structure generally needs to be sufficient to significantly raise the temperature of the top of the food item resting on the heating plate.

Also, it will be appreciated that the basic parts of the portable baking oven can have shapes other than the cylindrical and circular shapes of the described illustrated embodiments, for example, square or oval shapes. Accessory items could further be added to the oven, such as providing for the placement of a smoker box in the heating chamber of the oven base.

What we claim is:

1. A baking oven for a pizza or other food items, comprising:
    a two part heating plate comprising an upper plate portion and a lower plate portion with the upper plate portion and the lower plate portion defining an air gap,
    a base having a heating chamber, the base comprising an upright cylindrical ring wall section with a plurality of heating plate support brackets attached to the upright cylindrical ring wall section, the heating plate support brackets supporting the two part heating plate above the base's heating chamber,
    a passive top cover having a moisture vent, the top cover being sized and formed to fit over and to be supported by the base such that when placed on the base the top cover forms a baking chamber above the two part heating plate,
    an air passageway defined by the base and a perimeter edge of the two part heating plate thermally connecting the heating chamber in the base and the baking chamber wherein heat produced in the heating chamber can circulate up through the air passageway into the baking chamber above the two part heating plate, and
    a planar heat reflector structure in the top cover parallel to the two part heating plate, the heat reflector structure extending across the inside of the top cover and positioned in the top cover such that, when the top cover is placed over the base, the reflector structure is superior to and faces the two part heating plate, wherein heat circulated from the heating chamber in the base up into the baking chamber is reflected back down toward the two part heating plate to accelerate the baking of a top side of a food item resting upon two part heating plate, the reflector structure defining a plurality of perforations to allow moisture given off by a food item being baked in the baking oven to escape through the moisture vent of the top cover.

2. The baking oven of claim 1 wherein the moisture vent in the top cover provides an open area in the top cover and wherein the perforations in the heat reflector structure in the top cover have a total area that is approximately equal to the open area of the top cover's moisture vent.

3. The baking oven of claim 1 wherein the perforations in the heat reflector structure in the top cover are substantially evenly distributed over a substantial portion of the heat reflector structure.

4. The baking oven of claim 1 wherein the top cover has a front access opening therein for accessing the baking chamber of the oven when the top cover is in place on the base.

5. The baking oven of claim 4 wherein the front access opening of the top cover has a top edge and wherein the reflector structure is positioned in the top cover near the level of the top edge of the front access opening.

6. The baking oven of claim 4 wherein the front access opening of the top cover has a top edge, and wherein an extender brim projects from the top cover along the top edge of the front access opening.

7. The baking oven of claim 1 wherein the reflector structure is positioned in the top cover at a level wherein the reflector structure is no more than about 3½ inches from the two part heating plate when the top cover is placed on the base of the oven.

8. The baking oven of claim 1 wherein the reflector structure is positioned in the top cover at a level where the reflector structure is between about 2 inches and about 3 inches from the two part heating plate when the top cover is placed on the base of the oven.

9. The baking oven of claim 1 wherein the reflector structure is a substantially flat reflector plate oriented substantially parallel to the two part heating plate supported on the base of the oven when the top cover is placed on the base.

10. The baking oven of claim 1 wherein the heating plate support brackets include centering tabs and the brackets are attached to an upright ring wall section of the base.

11. The baking oven of claim 1 wherein the dimension across the two part heating plate is smaller than the dimension across the upright ring wall section of the base, and wherein the two part heating plate sits on the heating plate support brackets and wherein an air passageway is formed between the upright ring wall section and the perimeter edge of the two part heating plate.

12. A baking oven for a pizza or other food items, comprising
    a heating plate having a perimeter edge,
    a base having a heating chamber, the base including an upright cylindrical ring wall section attached to a plurality of heating plate support brackets for supporting the heating plate above the base's heating chamber, a passive top cover having a moisture vent, the top cover sized and formed to fit over and to be supported by the base such that when placed on the base the top cover forms a baking chamber above the heating plate, the top cover having a front access opening therein for accessing the baking chamber of the oven when the top cover is in place on the base, an air passageway comprising a void defined by the perimeter edge of the heating plate and an inside surface of the base, the air passageway thermally connecting the heating chamber in the base and the baking chamber formed by the top cover wherein heat produced in the heating chamber can circulate up through the air passageway into the baking chamber above the heating plate, and a planar heat reflector structure fastened in the top cover, the heat reflector structure parallel to the heating plate and extending across the inside of the top cover below the top cover's moisture vent and being positioned in the top cover such that, when the top cover is placed over the base, the reflector structure therein faces the heating plate, wherein heat circulated from the heating chamber in the base up into the baking chamber formed by the top cover is reflected back down toward the heating plate to accelerate the baking of the top of a food item resting on the heating plate, the heat reflector structure having openings through which moisture given off by a food item being baked in the oven can pass, whereby the moisture can pass from the baking oven through the moisture vent in the top cover.

13. The baking oven of claim 12 wherein the front access opening of the top cover has a top edge and wherein the heat reflector structure in the top cover is positioned in the top cover near the level of the top edge of the front access opening.

14. The baking oven of claim 13 wherein the front access opening has a maximum height between about 2 inches and about 3 inches.

15. The baking oven of claim 12 wherein the openings in the heat reflector structure in the top cover are substantially evenly distributed over a substantial portion of the heat reflector structure.

16. The baking oven of claim 15 wherein the moisture vent in the top cover provides an open area in the top cover and wherein the openings in the heat reflector structure have a total area that is approximately equal to the open area of the top cover's moisture vent.

17. The baking oven of claim 12 wherein the air passageway includes differently sized air passageways around the perimeter edge of the heating plate wherein heat produced in the heating chamber can circulate up through the air passageway into the baking chamber above the heating plate in an unbalanced heat flow so as to correct for imbalances in temperature within the baking chamber caused by the front access opening in the top cover.

18. A baking oven for a pizza or other food items, comprising
a heating plate having a perimeter edge,
a base having a heating chamber, the base including an upright cylindrical ring wall section attached to a plurality of heating plate support brackets for supporting the heating plate above the base's heating chamber,
a passive top cover having a top area and voids in the top area forming a moisture vent in the top cover, the top cover being sized and formed to fit over and to be supported by the base such that when placed on the base the top cover forms a baking chamber above the heating plate, the top cover having a front access opening therein for accessing the baking chamber of the oven when the top cover is in place on the base,
air passageway means for thermally connecting the heating chamber in the base and the baking chamber formed by the top cover wherein heat produced in the heating chamber can circulate up through the air passageway means into the baking chamber above the heating plate, the air passageway means being adapted to circulate heat into the oven's baking chamber around the perimeter edge of the heating plate, and
a planar heat reflector plate in the top cover, the heat reflector plate parallel to the heating plate and extending across the inside of the top cover below the top cover's moisture vent and being positioned in the top cover such that, when the top cover is placed over the base, the heat reflector plate therein faces the heating plate, wherein heat circulated from the heating chamber in the base up into the baking chamber formed by the top cover is reflected back down toward the heating plate to accelerate the baking of the top of a food item resting on the heating plate,
the heat reflector plate defining a plurality of voids.

19. The baking oven of claim 18 wherein the total area of the voids for the moisture vent in the top cover is approximately equal to the total area of the perforations in the heat reflector plate in the top cover.

20. The baking oven of claim 18 wherein the front access opening of the top cover has a top edge and wherein the heat reflector plate is positioned in the top cover near the level of the top edge of the front access opening.

21. The baking oven of claim 20 wherein the front access opening has a maximum height between about 2 inches and about 3 inches.

22. The baking oven of claim 18 wherein the heat reflector plate is oriented substantially parallel to the heating plate when the top cover is placed on the base.

* * * * *